Aug. 7, 1923.

C. B. WATERS

ELECTRIC WELDING APPARATUS

Original Filed July 2, 1918

1,464,145

Inventor
Charles B. Waters
William A. Strauch
Attorney
By

Patented Aug. 7, 1923.

1,464,145

UNITED STATES PATENT OFFICE.

CHARLES B. WATERS, OF MONTCLAIR, NEW JERSEY.

ELECTRIC WELDING APPARATUS.

Original application filed July 2, 1918, Serial No. 243,002. Divided and this application filed July 5, 1923. Serial No. 649,613.

*To all whom it may concern:*

Be it known that CHARLES B. WATERS, citizen of the United States of America, residing at Montclair, in the county of Essex and State of New Jersey, has invented certain new and useful Improvements in Electric Welding Apparatus, of which the following is a specification.

The invention relates to current regulating apparatus, for example as employed in connection with the operation of arc lamps, electric furnaces, and melting and fusing apparatus; and more particularly as embodied in a device for adapting alternating current to electric cutting or welding apparatus of the arc type to provide the requisite heat, as shown in copending application S. N. 243,002 filed July 2, 1918, and of which the present application is a division.

The object of the invention is to provide a self regulating current controlling device or transformer for use with a variable resistance circuit, encountered, for example, in the operation of electric arc welding and cutting apparatus. By means of a cutting or welding transformer of this character, the current employed for producing the arc will be maintained within predetermined limits and will provide a stable cutting or welding arc as well as affording, during operation, an absolute control of heat conditions by maintaining the proper voltage to hold the welding or cutting arc. Means may be provided, moreover, to enable a change of heat conditions to be effected. The novel transformer, also, is of simple and rugged construction, is conveniently transported, and is so designed as to be entirely without moving parts, or air gaps, either fixed or adjustable. It possesses furthermore, a high power factor, resulting in economy of operation. Moreover, an operator of but limited training and skill may use the same to produce a satisfactory weld therewith; and in the operation of welding or cutting, the usual type of electrodes, such as those of carbon or metal, may be employed.

The nature of the invention will be best understood when described in connection with the accompanying drawings, in which—

Similar characters of reference designate corresponding parts thruout the several views.

Figure 1:
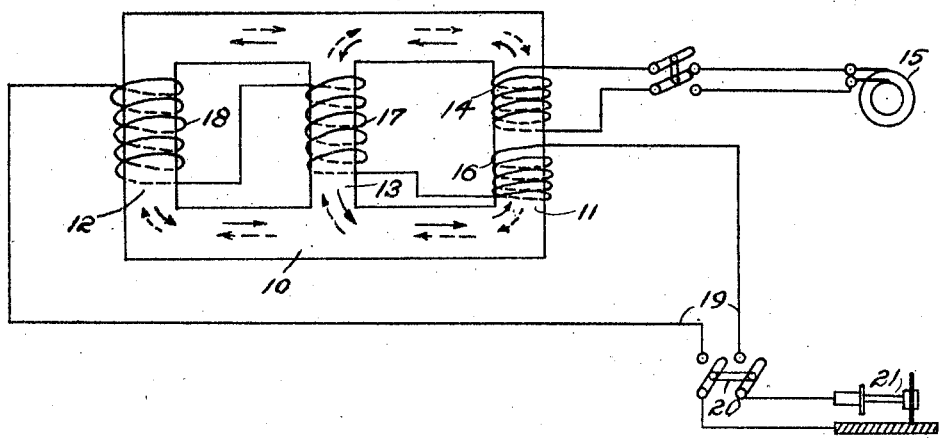
Fig. 1 illustrates, diagrammatically, the novel transformer and electrical connections.
Figure 2:
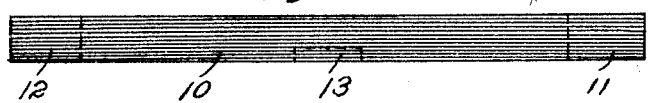
Fig. 2 is a plan of the transformer core.

Referring to Figs. 1 and 2 of the drawings, 10 designates a structure composed of laminated iron forming a closed magnetic circuit, and having two end cores 11 and 12 and an intermediate core 13, said member 10 being constructed in accordance with the usual and well-known manner of manufacturing transformer cores. About a portion of the core 11 is located a primary winding 14 which is connected to a suitable source of alternating current 15 of the proper voltage and maintained substantially constant. A secondary coil 16 is also wound about the core 11, being in inductive relationship to the primary winding coil 14, and continues about core 13, forming a coil 17 thereon and thence about the core 12, providing a coil 18 thereon. Leads 19 conduct the current of the secondary windings to a suitable switch 20, whence they are continued to the welding apparatus 21. The windings of coils 16, 19 and 18 are in series and such that the electromotive forces induced therein by the flux produced by the primary coil 14 are added to each other, the path of the flux being indicated in Fig. 1 by arrows shown in full lines. The intermediate core 13 and its coil 17 operate as a balancing winding and magnetic shunt, acting in manner hereinafter set forth.

Current passing thru the primary coil 14 causes a flux to circulate around the cores 11, 12 and 13, the latter acting as a shunt or closed path to the former. When the secondary circuit is closed, the current flowing thru coils 16, 17 and 18 will develop an opposing flux, indicated by the arrows shown in Fig. 1 in dotted lines, the core 13 serving, also, to shunt the same as in the case of the flux produced by coil 14. The said coil 17, moreover, is designed to possess sufficient turns to prevent a substantial amount of the last-named flux entering said core.

In operation, when the secondary current is small, coil 17 exerts very little counter magneto-motive force, and the core 13, therefore, shunts a relatively large proportion of the flux produced by the primary coil 14. The effect of same is to introduce a heavy inductance at light load and correspondingly reduce the current. As the current increases in strength, coil 17 exerts a greater counter magneto-motive force, so that only a portion of the flux produced by the primary coil will be shunted by said core 13. The cross-sectional area of core 13, moreover, is small as compared with the corresponding areas of cores 11 and 12, and this also serves to limit the shunting effect of the core 13, which is worked at the saturation point. The result is that an arc is maintained at the electrodes 21, which is stable and of high power factor, due to the reduced shunting effect at rated load.

Figure 3:
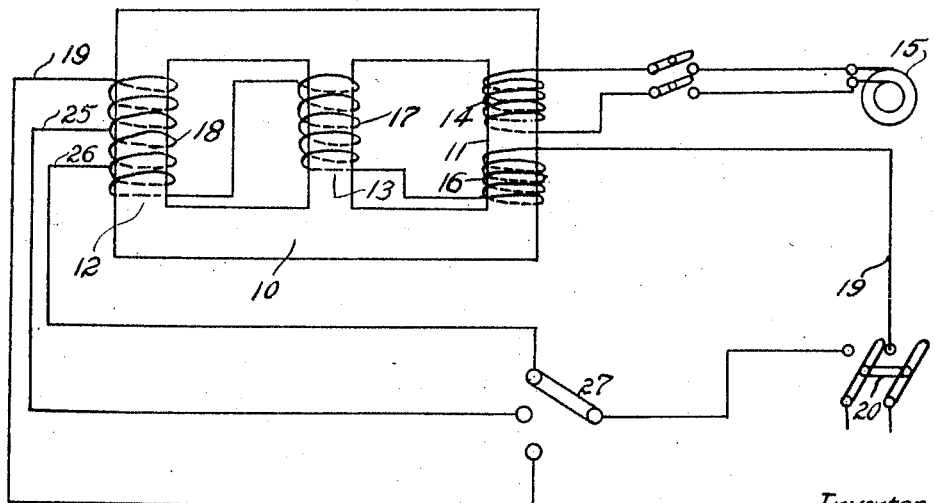
Fig. 3 illustrates a modification whereby the transformer may be adapted to various loads.

To provide for different loads of welding and cutting currents, the ratio of the number of turns of coil 16 to coil 18 may be varied, as for example by providing taps 25 and 26 from the latter coil and connecting them first thru a suitable multi-point switch 27, Fig. 3.

Having described my invention what is desired to be secured by Letters Patent and claimed as new is:

1. Apparatus for metallic arc welding including a transformer having a core comprising a main magnetizable circuit and a magnetizable shunt; a primary winding on said main circuit; a secondary winding on said main circuit; and a booster winding on said shunt circuit; said booster winding adding the voltage induced therein to the open circuit voltage of said secondary winding.

2. The combination as set forth in claim 1 together with an electrode holder, a metallic electrode, an article to be welded, and leads connecting said electrode holder and said article in circuit with said secondary winding.

3. Apparatus for metallic arc welding including a transformer having a core with a plurality of yokes and a plurality of legs, a primary winding on one of said legs, a secondary winding on another one of said legs, and a booster winding on a third one of said legs, said booster winding adding the voltage induced therein to the open circuit voltage of said secondary winding.

4. The combination as set forth in claim 3 in which an additional secondary winding is applied to the leg upon which said primary is wound.

5. The combination as set forth in claim 3 in which the core comprises a closed magnetic circuit.

In testimony whereof he has affixed his signature.

CHARLES B. WATERS.